(12) United States Patent
Wild et al.

(10) Patent No.: US 8,991,899 B2
(45) Date of Patent: Mar. 31, 2015

(54) AIR-GUIDING DEVICE FOR A VEHICLE

(71) Applicant: Dr. Ing. h.c. F. Porsche Aktiengesellschaft, Stuttgart (DE)

(72) Inventors: Jochen Wild, Magstadt (DE); Bernd Kasperowski, Schwieberdingen (DE); Joachim Paul, Stuttgart (DE); Bernd Herrmann, Ehningen (DE); Dominik Beierl, Korntal-Muenchingen (DE); Frank Neubrand, Weil der Stadt (DE); Haiko Neher, Sachsenheim (DE); Alexander Gaida, Urbach (DE); Roi Nunez Millan, Waldenbuch (DE); Sandra Hoerlezeder, Herrenberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/284,571

(22) Filed: May 22, 2014

(65) Prior Publication Data

US 2014/0346810 A1    Nov. 27, 2014

(30) Foreign Application Priority Data

May 22, 2013 (DE) .......................... 10 2013 105 223

(51) Int. Cl.
*B62D 35/00* (2006.01)
(52) U.S. Cl.
CPC .................................. *B62D 35/007* (2013.01)
USPC ..................................................... 296/180.5

(58) Field of Classification Search
USPC .................................. 296/180.1, 180.4, 180.5
See application file for complete search history.

(56) References Cited

U.S. PATENT DOCUMENTS 7,380,871 B2    6/2008 Froeschle et al.
2007/0228771 A1*  10/2007 Froeschle et al. .......... 296/180.1

FOREIGN PATENT DOCUMENTS

DE          30 19 150 A1      11/1981
DE          102007025472      12/2008
EP          2 050 662 A1      4/2009

* cited by examiner

*Primary Examiner* — Joseph D Pape
(74) *Attorney, Agent, or Firm* — Gerald E. Hespos; Michael J. Porco; Matthew T. Hespos (57) ABSTRACT

An air-guiding device (12) is arranged in a rear-end region of a vehicle and has a central main air-guiding element (13) that is displaceable from a retracted rest position into a deployed operating position. Lateral auxiliary air-guiding elements (14, 15) are adjustable substantially linearly relative to the main air-guiding element (13) in a direction transverse to the longitudinal direction of the vehicle to be transferred from a rest position, in which they are retracted into the main air-guiding element (13), into an operating position, in which they are deployed out of the main air-guiding element (13). Each auxiliary air-guiding element is movable along a guide unit (22) in the main air-guiding element (13) and is guided in the guide unit (22) in a first direction by at least one slide element (26) and in a second direction by at least one guide pin (27).

17 Claims, 7 Drawing Sheets

AIR-GUIDING DEVICE FOR A VEHICLE

CROSS REFERENCE TO RELATED APPLICATION

This application claims priority under 35 USC 119 to German Patent Appl. No. 10 2013 105 223.1 filed on May 22, 2013, the entire disclosure of which is incorporated herein by reference.

BACKGROUND

1. Field of the Invention

The invention relates to an air-guiding device for a vehicle.

2. Description of the Related Art

DE 10 2006 014 261 A1 discloses an air-guiding device having a main air-guiding element and two lateral auxiliary air-guiding elements. The auxiliary air-guiding elements are displaceable substantially linearly relative to the main air-guiding element in a substantially horizontal direction transverse to the longitudinal direction of the vehicle. The lateral auxiliary air-guiding elements are guided in a guide unit and can be displaced in a manner coupled to the displacement of the main air-guiding element or independently of the displacement of the main air-guiding element by means of a separate drive. In a rest position, the auxiliary air-guiding elements are retracted into the main air-guiding element. However, in an operating position, the auxiliary air-guiding elements are deployed out of the main air-guiding element.

It is an object of the invention to provide a structurally simple air-guiding device for a vehicle that enables auxiliary air-guiding elements to be displaced relative to a main air-guiding element in a simple and reliable manner.

SUMMARY OF THE INVENTION

The invention relates to an air guiding device with two auxiliary air-guiding elements. Each auxiliary air guiding is guided in a guide unit both in a first direction by at least one slide element and also in a second direction by at least one guide element.

The air-guiding device of the invention provides a compact construction for guiding the lateral auxiliary air-guiding elements in the guide unit, and thus in the main air-guiding element in two different directions by at least one slide element and at least one guide element. This configuration ensures unrestricted displacement of the auxiliary air-guiding elements relative to the main air-guiding elements, and prevents blocking of the auxiliary air-guiding elements during displacement relative to the main air-guiding element.

The guide unit preferably has a first or lower guide element and a second or upper guide element in the region of each auxiliary air-guiding element. Thus, the respective auxiliary air-guiding element is guided between the respective lower and upper guide elements in a vertical direction by multiple slide elements. This guidance of the auxiliary air-guiding elements in the vertical direction between the two guide elements of the guide unit is particularly simple and saves structural space.

Each guide element of the respective auxiliary air-guiding element preferably engages in a groove that extends in the direction of displacement of the respective auxiliary air-guiding element. More particularly, a guide pin guides the respective auxiliary air-guiding element in the longitudinal direction of the vehicle. The guidance of the auxiliary air-guiding elements in the longitudinal direction of the vehicle by guide elements that engage in grooves is reliable and saves structural space.

Both auxiliary air-guiding elements preferably can be adjusted transversely with respect to the longitudinal direction of the vehicle by a common drive. The drive preferably comprises a motor, a gear mechanism and spindles. Each spindle may engage on one of the two auxiliary air-guiding elements and is coupled to the motor via the gear mechanism. The displacement of the auxiliary air-guiding elements relative to the main air-guiding element by spindles that can be driven by a common motor via a gear mechanism is reliable and requires little structural space.

Each spindle preferably engages the gear mechanism via a flexible shaft. The connection of the spindles to the gear mechanism via flexible shafts is reliable, requires little structural space and compensates for angular positions of the auxiliary elements.

Each spindle preferably is mounted on the guide unit by a fixed bearing and on the auxiliary air-guiding element by a floating bearing. This ensures unrestricted displaceability of the auxiliary air-guiding elements relative to the main air-guiding element in a minimal space, without the risk of blocking the auxiliary air-guiding elements.

Each auxiliary air-guiding element preferably is fixed in its end positions by a self-locking action in the spindles. In this way, the auxiliary air-guiding elements can be fixed in a defined manner in both their deployed end position and also in their retracted end position. An undesired relative movement of the auxiliary air-guiding elements relative to the main air-guiding element in the end positions can be avoided. Locking also is possible by additional elements, such as rubber elements. Furthermore, the spindles may exhibit a continuous self-locking characteristic for different positions to be set.

The main air-guiding element preferably has a housing composed of a first or lower housing element and a second or upper housing element. The guide unit for the auxiliary air-guiding elements, and in the retracted state also the auxiliary air-guiding elements, are positioned between the housing elements of the main air-guiding element. A seal preferably is provided to seal off the auxiliary air-guiding elements with respect to the main air-guiding element. This embodiment ensures a compact construction and prevents moisture and/or dirt from the environment from passing into the interior of the air-guiding device via the interface between the main air-guiding element and the two auxiliary air-guiding elements.

Exemplary embodiments of the invention will be explained in more detail on the basis of the drawings, without the invention being restricted to these.

DETAILED DESCRIPTION OF THE PREFERRED EMBODIMENTS

Figure 1:
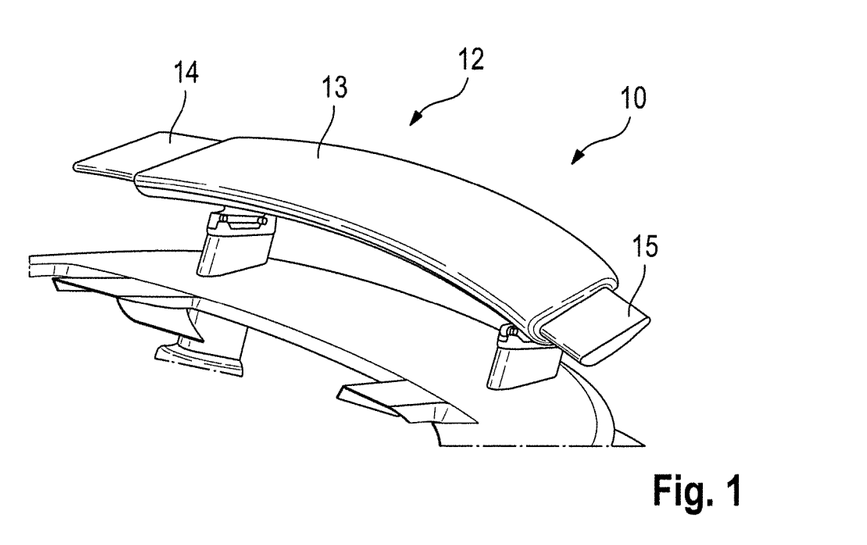
FIG. 1 shows a detail from a rear-end region of a vehicle in the region of a deployed air-guiding device according to the invention.
Figure 2:
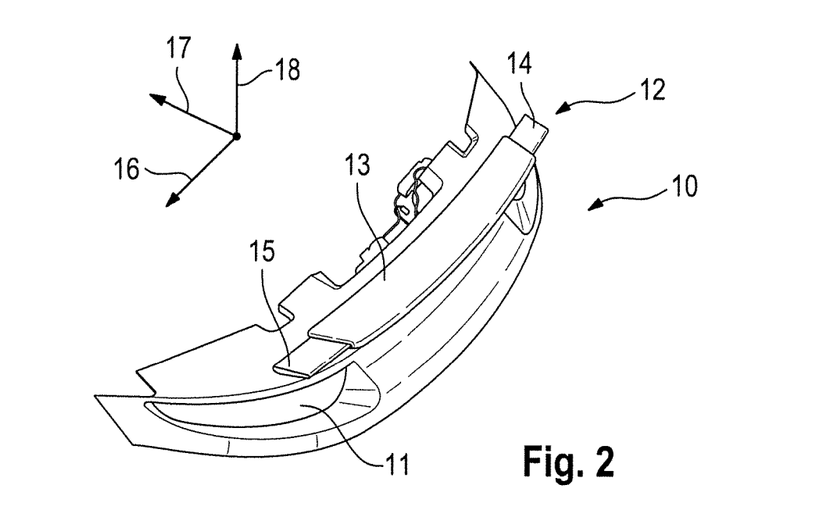
FIG. 2 shows the rear-end region of FIG. 1 in a second view.
Figures 3, 4A:
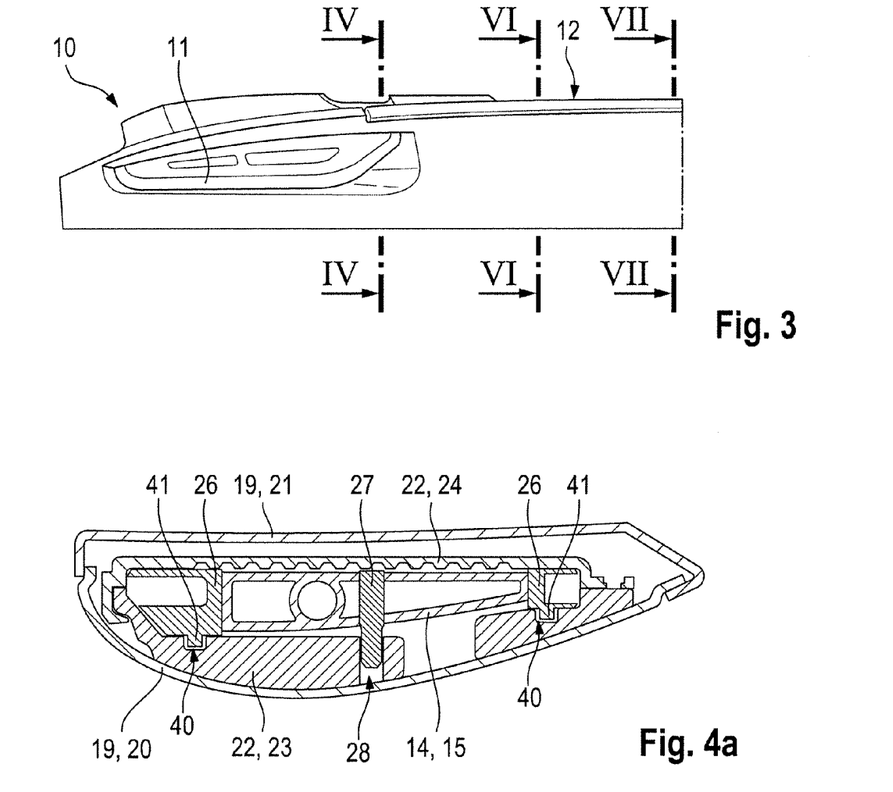
FIG. 3 shows the rear-end region of FIG. 1 in a third view, with the air-guiding device retracted.
FIGS. 4a and 4b show the cross section IV-IV of FIG. 3.

FIGS. 1, 2 and 3 each show different views of a rear-end region 10 of a vehicle, including taillights 11 and an air-guiding device 12 between taillights 11. The air-guiding device 12 can be displaced between a retracted rest position and a deployed operating position. FIGS. 1 and 2 show the air-guiding device 12 in the deployed operating position, whereas FIG. 3 shows the air-guiding device 12 in the retracted rest position.

The air-guiding device 12 comprises a central main air-guiding element 13 and two lateral auxiliary air-guiding elements 14, 15.

The two lateral auxiliary air-guiding elements 14, 15 are displaceable substantially linearly relative to the central main air-guiding element 13 in a substantially horizontal direction 16 that runs transverse to the longitudinal direction 17 of the vehicle. The main air-guiding element 13 can be displaced in a substantially vertical direction 18 during the displacement between the rest position and the operating position.

The two auxiliary air-guiding elements 14, 15 are retracted into the main air-guiding element 13 and the main air-guiding element 13 is lowered when the air-guiding device 12 assumes the rest position of FIG. 3. By contrast, the main air-guiding element 13 is deployed in the vertical direction 18, and the two auxiliary air-guiding elements 14 and 15 are displaced out of the main air-guiding element 13 in a horizontal direction transverse to the longitudinal direction 17 of the vehicle in the operating position of FIGS. 1 and 2.

Figure 15:
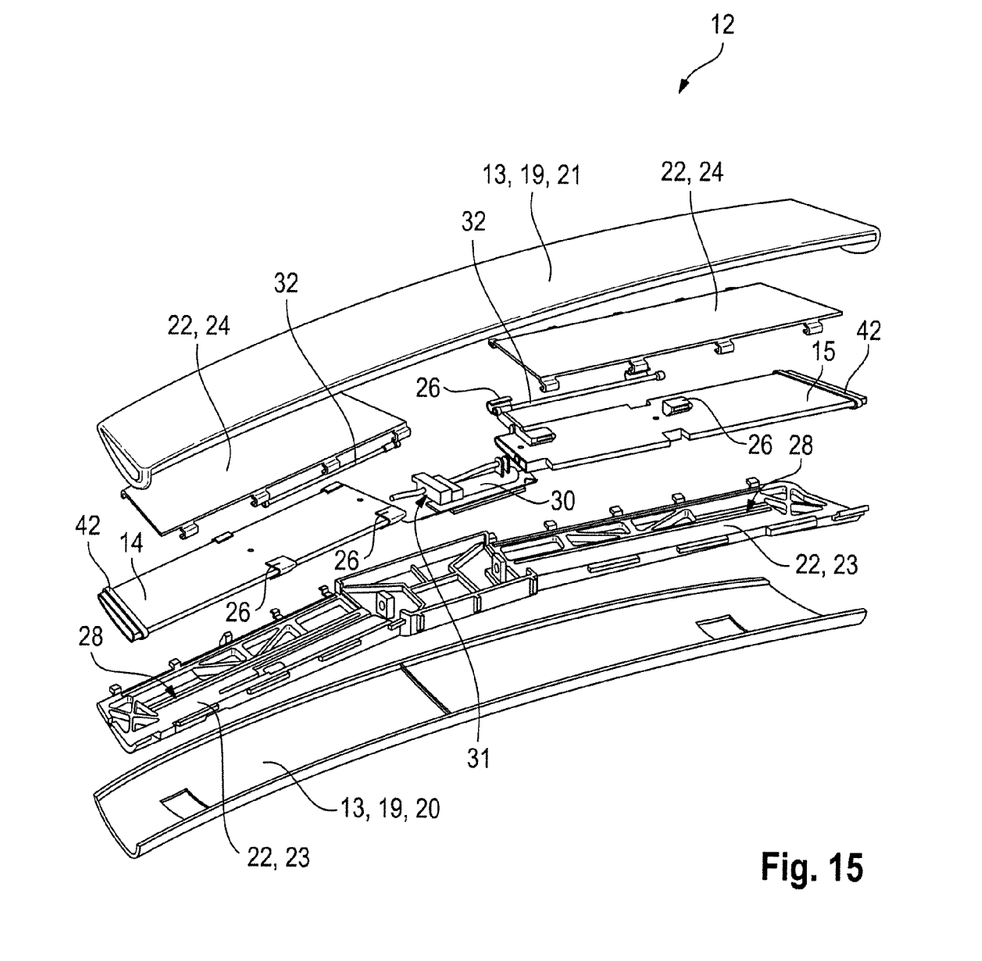
FIG. 15 is an exploded illustration of the air-guiding device.

The main air-guiding element 13 of the air-guiding device 12 has a housing 19 assembled from a first or lower housing element 20 and a second or upper housing element 21, as shown in FIG. 15.

The housing 19 of the main air-guiding element 13 defines an interior space that accommodates a guide unit 22 for guiding the two auxiliary air-guiding elements 14, 15 and for accommodating the two auxiliary air-guiding elements 14 and 15 in the retracted rest position. The guide unit 22 of the air-guiding device 12 comprises a first or lower guide element 23 and a second, upper guide element 24 in the region of each auxiliary air-guiding element 14, 15. In the preferred embodiment, the two lower guide elements 23 of the guide unit 22 are integral or unitary with one another. By contrast, the two upper guide elements 24 of the guide unit 22 are separate.

Each auxiliary air-guiding element 14, 15 is guided in the main air-guiding element 13 by the guide unit 22 and is movable substantially horizontally and linearly along the guide unit 22 transverse to the longitudinal direction of the vehicle during displacement of the auxiliary air-guiding elements 14, 15 relative to the main air-guiding element 13 between the operating position and rest position. More particularly, movement of each auxiliary air-guiding element 14, 15 in the guide unit 22 in a first direction is limited by at least one slide element 26 and in a second direction is limited by at least one guide pin 27.

Figure 4B:
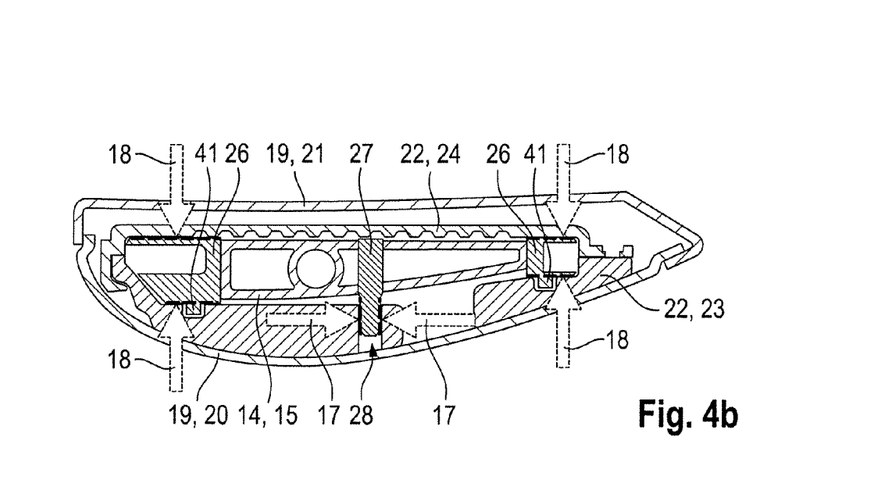

As shown most clearly from FIG. 4b, the respective auxiliary air-guiding element 14, 15 is positioned between the respective lower and upper guide elements 23 and 24 of the guide unit 22 and movement of the auxiliary air-guiding element 14, 15 between the guide elements 23, 24 of the guide unit 22 in the vertical direction 18 is limited by multiple slide elements 26 that are mounted to front and rear ends of the auxiliary air-guiding elements 14, 15 at plural positions along the auxiliary air-guiding elements 14, 15 in the direction of displacement 16.

Figure 5:
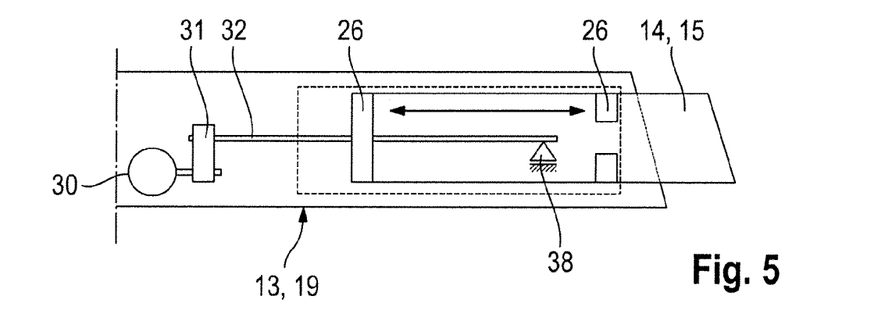
FIG. 5 is a schematic illustration in the region of an auxiliary air-guiding element.
Figure 6:
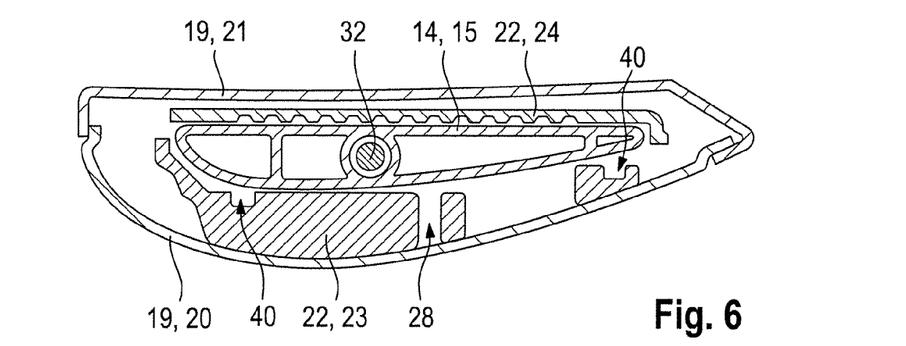
FIG. 6 is a cross section along line VI-VI in FIG. 3.

In particular, multiple such slide elements 26 engage on each auxiliary air-guiding element 14, 15, as viewed in the direction of displacement of the auxiliary air-guiding elements 14, 15, on inner or rear sections and on central sections of the auxiliary air-guiding elements 14, 15, as shown in FIGS. 5 and 15.

Vertical movement of each auxiliary air-guiding element 14, 15 in the guide unit 22 is limited by the slide elements 26 and movement in a second direction is limited by at least one guide pin 27. As shown in FIGS. 4a and 4b, each guide pin 27 of the respective auxiliary air-guiding element 14, 15 engages into a groove 28, that extends in the direction of displacement 16 of the respective auxiliary air-guiding element 14, 15, of the respective guide unit 22 and limits movement of the respective auxiliary air-guiding element 14, 15 in the horizontal longitudinal direction 17 of the vehicle. The grooves 28 into which the guide pins 27 engage are formed in the lower guide elements 23 of the guide unit 22 in this embodiment.

Both auxiliary air-guiding elements 14, 15 can be adjusted relative to the main air-guiding element 13 transversely with respect to the longitudinal direction of the vehicle by a common drive 29 that comprises at least one motor 30, one gear mechanism 31 and spindles 32. The spindles 32 are threaded spindles with opposing threads (see FIG. 12), and each spindle 32 engages on one of the two air-guiding elements 14, 15. Furthermore, the spindles 32 engage on the motor 30 of the common drive 29 via the gear mechanism 31.

Figure 12:
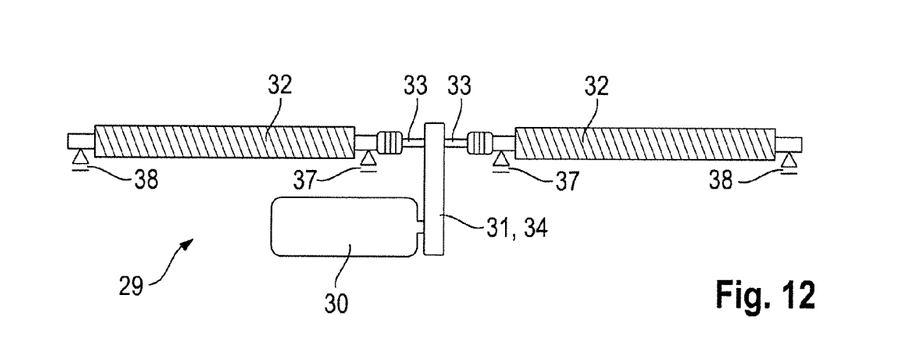
FIG. 12 is a schematic illustration of the drive of the auxiliary air-guiding elements.
Figure 13:
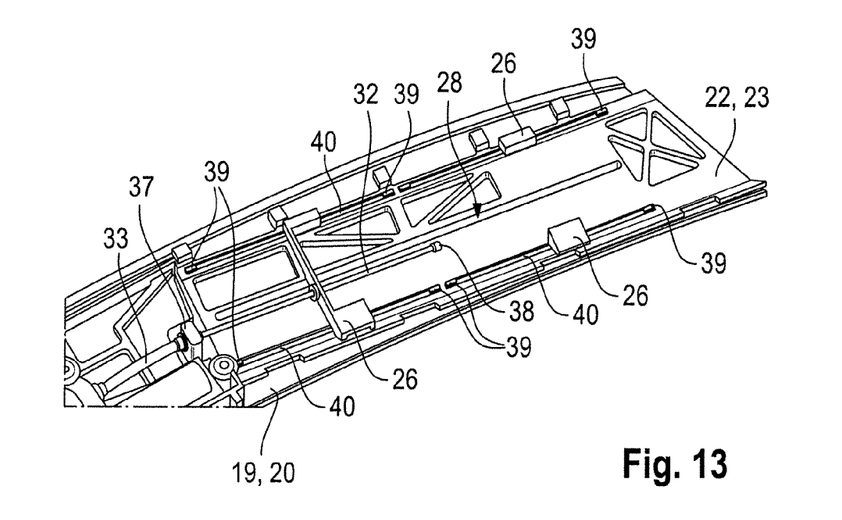
FIG. 13 shows a further detail of the air-guiding device.

Flexible shafts 33 connect the respective spindles 32 to the gear mechanism 31. Thus, the assemblies of the drive 29 are integrated into the main air-guiding element 13 of the air-guiding device 12 while ensuring a minimal structural space. The flexible shafts 33 compensate for the angular offset of the auxiliary air-guiding elements 14, 15.

Figure 7:
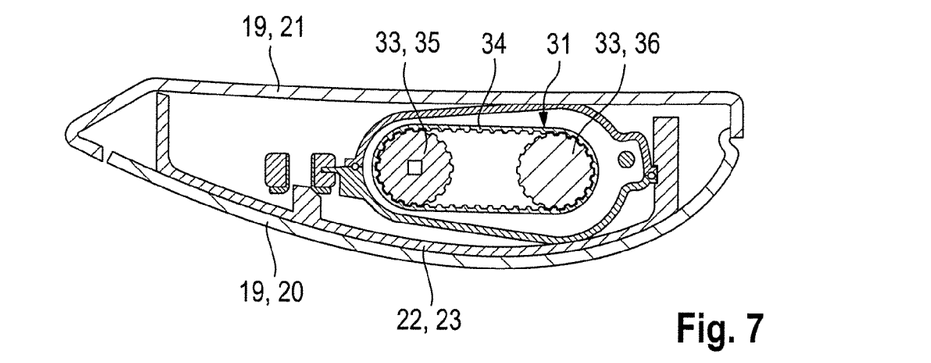
FIG. 7 is a cross section along line VII-VII in FIG. 3.
Figure 8:
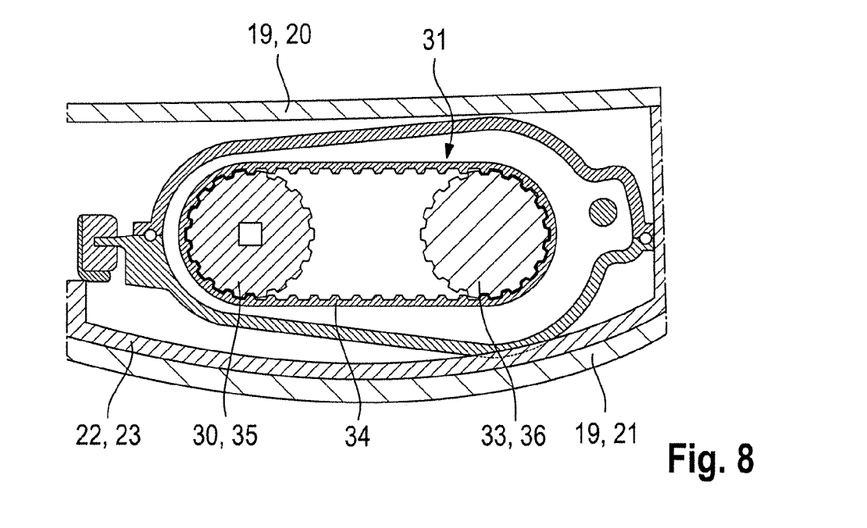
FIG. 8 shows an enlarged detail of FIG. 7.
Figure 9:
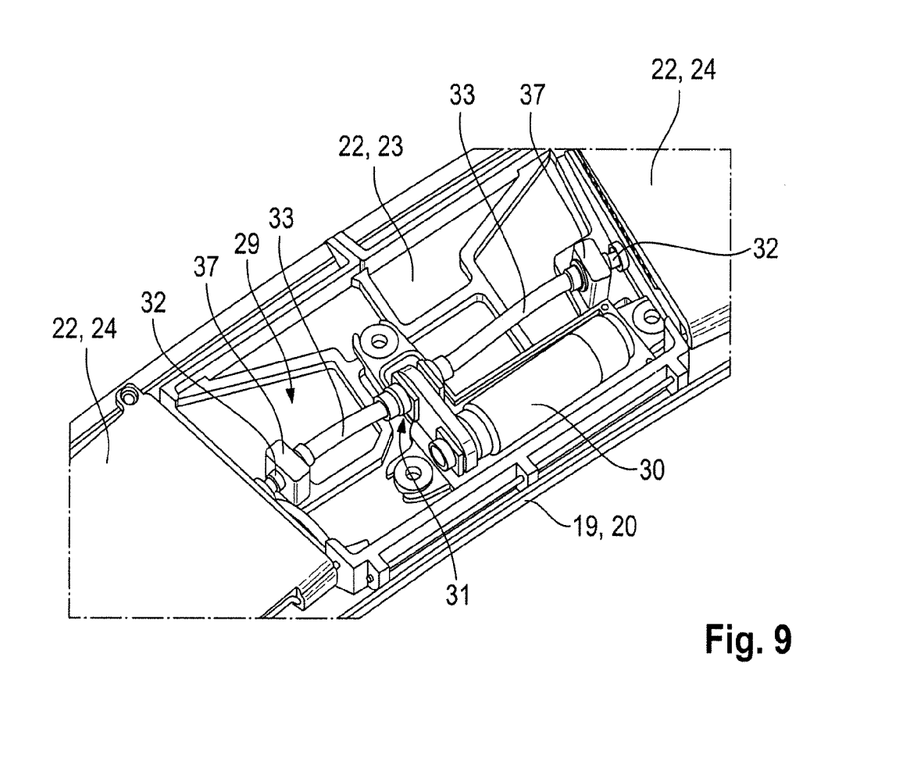
FIG. 9 shows a detail of the air-guiding device in the region of the drive for the auxiliary air-guiding elements.

The gear mechanism 31 is a diverting gear mechanism with a toothed belt 34 that engages the motor 30 and the flexible shafts 33, as shown in FIGS. 7 and 8. More particularly, the toothed belt 34 engages on a gearwheel 35 that is coupled to the flexible shafts 33 and on a gearwheel 36 that is coupled to a shaft of the motor 30.

Figure 10:
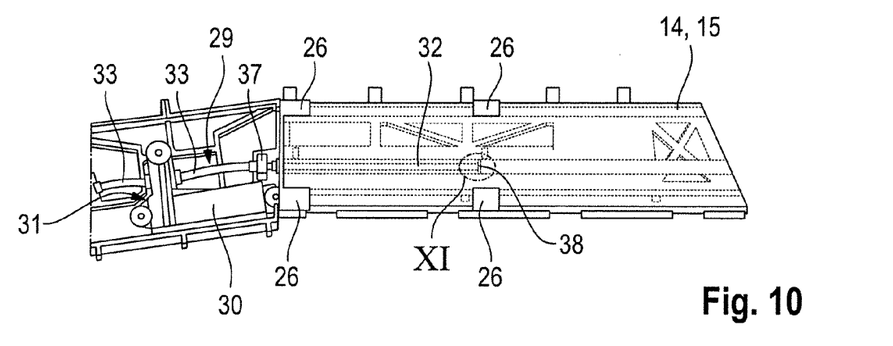
FIG. 10 shows a further detail of the air-guiding device in the region of the drive for the auxiliary air-guiding elements.
Figure 11:
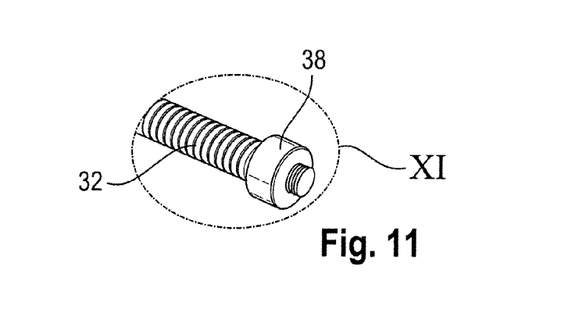
FIG. 11 shows an enlarged detail of FIG. 10.

Each of the spindles 32 is mounted on the guide unit 22 by a fixed bearing 37 and on the auxiliary air-guiding elements 14 and 15 by a floating bearing 38. The fixed bearing 37 is a bearing block of the guide unit 22 in the region where the spindle 32 is connected to the respective flexible shaft 33, as shown in FIG. 10. The floating bearing 38 is formed between the spindle 32 and the respective auxiliary air-guiding element 14, 15. Each floating bearing 38 is a slide bushing in the respective auxiliary air-guiding element 14 and 15.

Each air-guiding element 14, 15 is fixed in its end positions by a self-locking action in the spindles 32. The auxiliary air-guiding elements 14, 15, in their end positions, abut against elastic end position buffers 39 that are embedded in grooves 40 in the lower guide element 23 of the guide unit 22.

The slide elements 26 likewise engage, by way of projections 41, into the grooves 40 and abut against the elastic end position buffers 39 when the auxiliary air-guiding elements 14, 15 are in the end positions. The grooves 40 extend parallel to the groove 28.

The main air-guiding element 13 has a housing 19 comprised of the housing elements 20, 21, and the guide unit 22 for the auxiliary air-guiding elements 14, 15 is positioned between the housing elements 20, 21 of the main air-guiding element 13, and in the retracted state the auxiliary air-guiding elements 14, 15 also are positioned therein.

Figure 14:
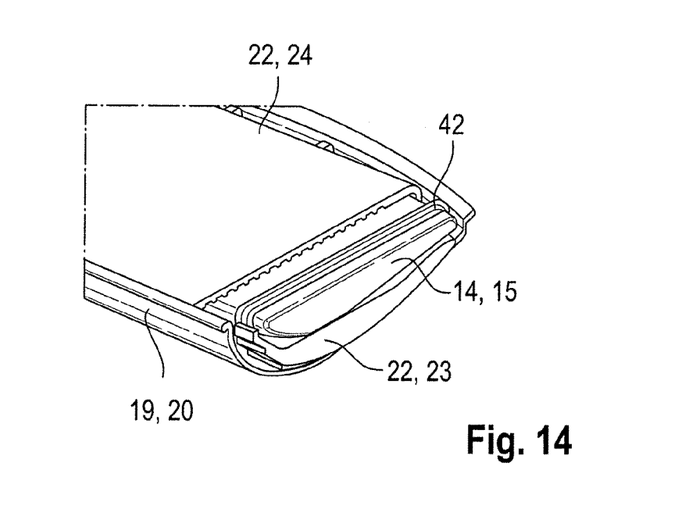
FIG. 14 shows a further detail of the air-guiding device in the region of an auxiliary air-guiding element.

A seal 42 in the form of a scraper seals off each auxiliary air-guiding element 14, 15 with respect to the main air-guiding element 13, as shown in FIG. 14. The seals 42 prevent moisture and/or dirt from the environment from entering into the interior of the air-guiding device 12 or the housing 19 of the main air-guiding element 13 via the interfaces between the main air-guiding element 13 and the respective auxiliary air-guiding elements 14, 15 during displacement of the auxiliary air-guiding elements 14, 15 relative to the main air-guiding element 13.

The two housing elements 20 and 21 of the housing 19 preferably are formed from a fiber composite material or an SMC material. The two lower guide elements 23 of the guide unit 22 are formed in one piece and, as a pressure die cast part, are preferably formed from aluminum or an aluminum alloy. The upper guide elements 24 of the guide unit 22 are extruded profile parts, preferably formed from aluminum or an aluminum alloy. The auxiliary air-guiding elements 14, 15 together with the guide pins 27 also preferably are extruded profile parts formed from aluminum or an aluminum alloy. The spindles 32 preferably are formed from steel, and the slide elements 26 are formed from fiber-reinforced polyamide.

What is claimed is:

1. An air-guiding device for a rear-end region of a vehicle and comprising: a central main air-guiding element that is displaceable from a retracted rest position into a deployed operating position, and two lateral auxiliary air-guiding elements that are adjustable substantially linearly relative to the main air-guiding element in a displacement direction transverse to a longitudinal direction of the vehicle between a rest position in which the auxiliary air-guiding elements are retracted into the main air-guiding element, and an operating position, in which the auxiliary air-guiding elements are deployed out of the main air-guiding element, each auxiliary air-guiding element being guided in, and movable along, a guide unit accommodated in the main air-guiding element, movement of each auxiliary air-guiding element in the guide unit in a vertical direction being limited by at least one slide element mounted to each of the auxiliary air-guiding elements and slidably engaged with an interior of the guide unit and movement of each air-guiding element in a longitudinal direction of the vehicle being limited by a guide element slidably engaged in a groove in the guide unit.

2. The air-guiding device of claim 1, wherein the guide unit has lower and upper guide elements in proximity to each auxiliary air-guiding element and the at least one slide element comprises multiple slide elements, movement of the respective auxiliary air-guiding elements between the lower and upper guide elements in a vertical direction being limited by the multiple slide elements.

3. The air-guiding device of claim 2, wherein each of the slide elements has a projection engaged into a groove that extends in the displacement direction of the respective auxiliary air-guiding element of the guide unit.

4. The air-guiding device of claim 3, further comprising elastic end position buffers in the grooves, the elastic end position buffers engaging the projections of the slide elements.

5. The air-guiding device of claim 1, wherein each guide element projects from the respective auxiliary air-guiding element and engages into a groove of the respective guide unit, the groove extending in the displacement direction of the respective auxiliary air-guiding element to limit movement of the respective auxiliary air-guiding element in the longitudinal direction of the vehicle.

6. The air-guiding device of claim 1, wherein the auxiliary air-guiding elements are displaceable in the displacement direction by a common drive, the drive comprising a motor, a gear mechanism and spindles, wherein each of the spindles engages on one of the two auxiliary air-guiding elements and is coupled to the motor via the gear mechanism.

7. The air-guiding device of claim 6, wherein the gear mechanism is a diverting gear mechanism with a toothed belt.

8. The air-guiding device of claim 7, wherein the spindles have opposing threads.

9. The air-guiding device of claim 6, wherein the spindles engage on the gear mechanism via flexible shafts.

10. The air-guiding device of claim 6, wherein each of the spindles is mounted on the guide unit by a fixed bearing and on the auxiliary air-guiding element by a floating bearing.

11. The air-guiding device of claim 6, wherein each of the auxiliary air-guiding elements is fixed in its end positions by a self-locking action in the spindles.

12. The air-guiding device of claim 1, wherein the main air-guiding element has a housing comprising a lower housing element and an upper housing element, the guide unit for the auxiliary air-guiding elements is positioned between the housing elements of the main air-guiding element.

13. The air-guiding device of claim 12, further comprising seals that seal off the auxiliary air-guiding elements with respect to the main air-guiding element.

14. The air-guiding device of claim 13, wherein the seals are mounted to outer projecting ends of the auxiliary air-guiding elements and seal to the main air-guiding element when the auxiliary air-guiding elements are in the rest position.

15. The air-guiding device of claim 2, wherein each of the slide elements and the guide elements of each of the auxiliary air-guiding elements are mounted to parts of the auxiliary air-guiding element that remain within the guide unit when the auxiliary air-guiding elements are in the operating position.

16. The air-guiding device of claim 2, wherein the multiple slide elements include at least one slide element mounted to each of front and rear edges of each of the auxiliary air-guiding elements.

17. The air-guiding device of claim 16, wherein the multiple slide elements include a plurality of slide elements mounted to each of the front and rear edges of each of the auxiliary air-guiding elements.

* * * * *